United States Patent
Venkataramani

(10) Patent No.: US 10,462,113 B1
(45) Date of Patent: Oct. 29, 2019

(54) SYSTEMS AND METHODS FOR SECURING PUSH AUTHENTICATIONS

(71) Applicant: Symantec Corporation, Mountain View, CA (US)

(72) Inventor: Srinath Venkataramani, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 211 days.

(21) Appl. No.: 15/717,320

(22) Filed: Sep. 27, 2017

(51) Int. Cl.
| | | |
|---|---|---|
| *H04L 29/06* | (2006.01) | |
| *H04L 9/32* | (2006.01) | |
| *H04L 9/08* | (2006.01) | |
| *H04L 9/30* | (2006.01) | |

(52) U.S. Cl.
CPC ........ *H04L 63/0442* (2013.01); *H04L 9/0825* (2013.01); *H04L 9/30* (2013.01); *H04L 9/3271* (2013.01); *H04L 63/08* (2013.01)

(58) Field of Classification Search
CPC .. H04L 9/0827; H04L 9/3271; H04L 63/0442
See application file for complete search history.

(56) References Cited

U.S. PATENT DOCUMENTS

| | | | | |
|---|---|---|---|---|
| 9,571,497 B1* | 2/2017 | Venkataramani | ....... | H04L 63/10 |
| 2008/0046988 A1* | 2/2008 | Baharis | ................ | H04L 9/3271 |
| | | | | 726/7 |
| 2012/0090017 A1* | 4/2012 | Herzog | ................... | H04L 51/38 |
| | | | | 726/4 |
| 2012/0198228 A1* | 8/2012 | Oberheide | ............ | H04L 63/062 |
| | | | | 713/155 |
| 2013/0198822 A1* | 8/2013 | Hitchcock | ............. | G06F 21/335 |
| | | | | 726/6 |
| 2016/0055322 A1* | 2/2016 | Thomas | ................... | G06F 21/10 |
| | | | | 726/7 |
| 2016/0269403 A1* | 9/2016 | Koutenaei | ........... | H04L 63/0861 |

OTHER PUBLICATIONS

"Synnantec VIP, Prevent unauthorized access to sensitive networks and applications, Datasheet: Authentication", 2 pages, copyright 2016. (Year: 2016).*
https://en.wikipedia.org/wiki/WhatsApp, last edited: Dec. 20, 2017.
https://medium.com/@BackmaskSWE/push-messages-isnt-secure-enough-69121c683cc6 , dated: Dec. 20, 2017.

* cited by examiner

*Primary Examiner* — Ponnoreay Pich
(74) *Attorney, Agent, or Firm* — FisherBroyles, LLP

(57) ABSTRACT

The disclosed computer-implemented method for securing push authentications may include (i) receiving, by a security service and from a security service relying party, a push authentication for a user that the security service relying party encrypted using a public key assigned to a client device of the user, (ii) forwarding, by the security service, the push authentication to the client device of the user, (iii) receiving, by the security service, a response to the push authentication from the client device of the user, and (iv) forwarding, by the security service, the response to the push authentication from the client device of the user to the security service relying party. Various other methods, systems, and computer-readable media are also disclosed.

20 Claims, 8 Drawing Sheets

SYSTEMS AND METHODS FOR SECURING PUSH AUTHENTICATIONS

BACKGROUND

Although the mobile device push authentications that some strong authentication providers use are a significant leap over traditional two-factor authentication procedures, the push authentications nevertheless may not be optimized along one or more dimensions. First, a relying party that transmits the push authentications to users may be concerned that the push authentications are transmitting sensitive information across an unprotected channel. The sensitive information may potentially include financial records, medical or health records, and/or driver or vehicle information, etc. Second, even in the case that the push authentications are transmitted using some form of encryption, there is an additional concern that the strong authentication provider may nevertheless decrypt and access the push authentication contents. In general, the potential ability of the strong authentication provider to access the push authentication contents raises concerns about privacy. The instant disclosure, therefore, identifies and addresses a need for systems and methods for securing push authentications.

SUMMARY

As will be described in greater detail below, the instant disclosure describes various systems and methods for securing push authentications. In one example, a computer-implemented method for securing push authentications may include (i) receiving, by a security service and from a security service relying party, a push authentication for a user that the security service relying party encrypted using a public key assigned to a client device of the user, the push authentication including a core message that is encrypted by the security service relying party based on a correct answer to a challenge-response question, (ii) forwarding, by the security service, the push authentication to the client device of the user, (iii) receiving, by the security service, a response to the push authentication from the client device of the user, and (iv) forwarding, by the security service, the response to the push authentication from the client device of the user to the security service relying party.

In one embodiment, the computer-implemented method may further include, prior to receiving the push authentication for the user: (i) receiving, from the client device, the public key of the client device after the client device generated the public key and a corresponding private key during a key-pair provisioning procedure and (ii) indexing the public key of the client device such that the security service relying party can look up the public key using a security service credential of the user as an indexed key. In one embodiment, the security service receives the push authentication in response to providing the public key to the security service relying party. In some examples, forwarding the push authentication to the client device of the user may include: (i) transmitting a transaction identifier to the client device, (ii) receiving, from the client device, a request for the push authentication, (iii) authenticating the request for the push authentication based on a secret shared between the security service and the client device, and (iv) transmitting the push authentication to the client device in response to authenticating the request for the push authentication. In one embodiment, the transaction identifier is transmitted to the client device through a push notification feature provided by a mobile device operating system of the client device.

In one embodiment, the correct answer to the challenge-response question is kept private from the security service such that the security service is prevented from reading the core message of the push authentication. In further embodiments, the correct answer to the challenge-response question is based on a user session of the user with the security service relying party through dynamic knowledge-based authentication. In further examples, the correct answer to the challenge-response question indicates an item of personally identifiable information of the user and/or an account number of the user with the security service relying party.

In one embodiment, the core message of the push authentication prompts the user to approve a transaction at the security service relying party. In further embodiments, the response to the push authentication approves the transaction at the security service relying party and the security service relying party completes the transaction in response to receiving the response to the push authentication from the client device of the user.

In one embodiment, a system for implementing the above-described method may include (i) a reception module, stored in memory, that receives, for a security service and from a security service relying party, a push authentication for a user that the security service relying party encrypted using a public key assigned to a client device of the user, the push authentication including a core message that is encrypted by the security service relying party based on a correct answer to a challenge-response question and (ii) a forwarding module, stored in memory, that forwards, for the security service, the push authentication to the client device of the user. In this example, (i) the reception module receives, for the security service, a response to the push authentication from the client device of the user and (ii) the forwarding module forwards, for the security service, the response to the push authentication from the client device of the user to the security service relying party. Moreover, in this example, the system may further include at least one physical processor configured to execute the reception module and the forwarding module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, by a security service and from a security service relying party, a push authentication for a user that the security service relying party encrypted using a public key assigned to a client device of the user, the push authentication including a core message that is encrypted by the security service relying party based on a correct answer to a challenge-response question, (ii) forward, by the security service, the push authentication to the client device of the user, (iii) receive, by the security service, a response to the push authentication from the client device of the user, and (iv) forward, by the security service, the response to the push authentication from the client device of the user to the security service relying party.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

Figure 1:
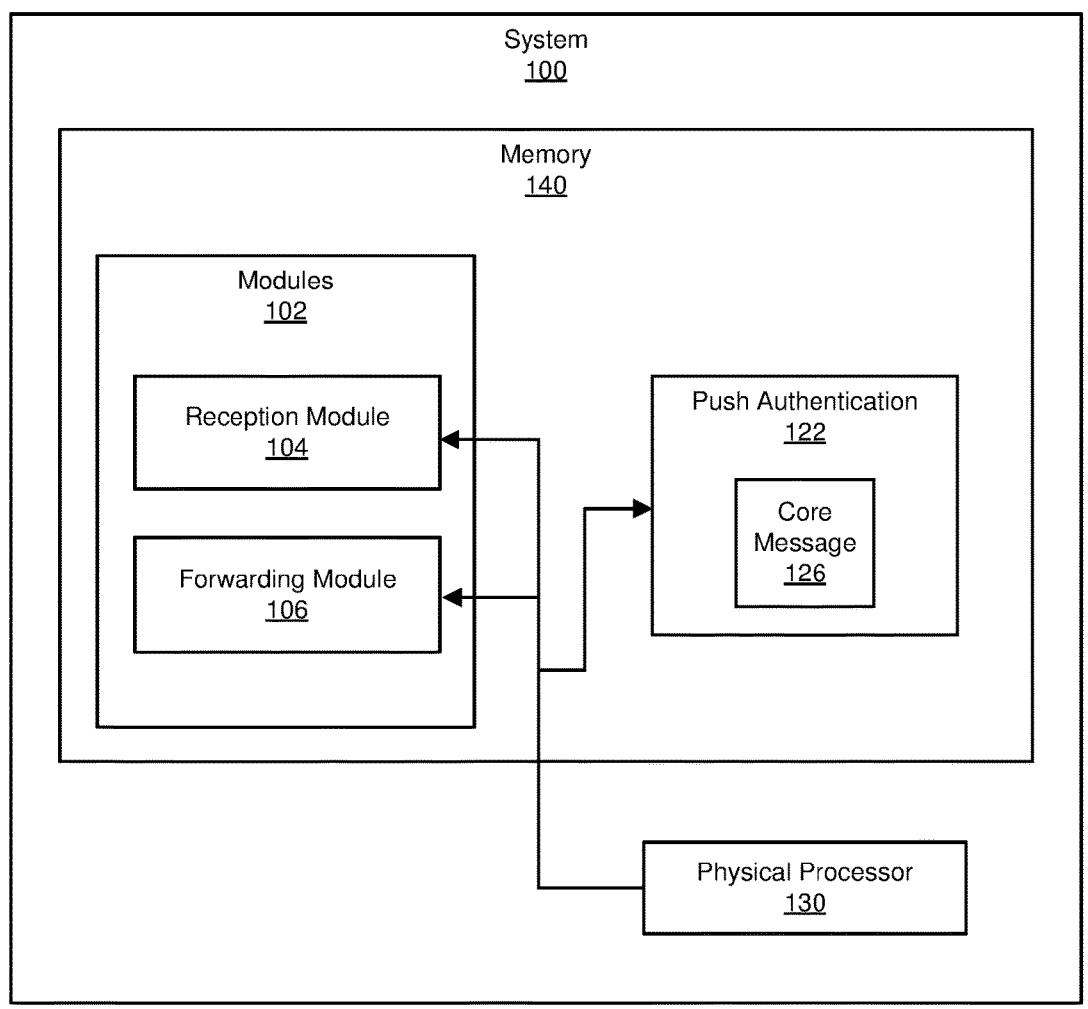
FIG. 1 is a block diagram of an example system for securing push authentications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for securing push authentications. The disclosed systems and methods may improve upon related push authentication technology by providing end-to-end encryption protection between a security service relying party and an endpoint device of a user. The end-to-end encryption protection may prevent a third-party strong authentication security service, such as SYMANTEC VALIDATION AND ID PROTECTION, from accessing content of the push authentications when providing security services as an intermediary. Accordingly, the security service relying party may securely transmit push authentications to the endpoint device of the user without enabling the third-party strong authentication security service, as a middleman, to access content of the push authentications.

Figure 2:
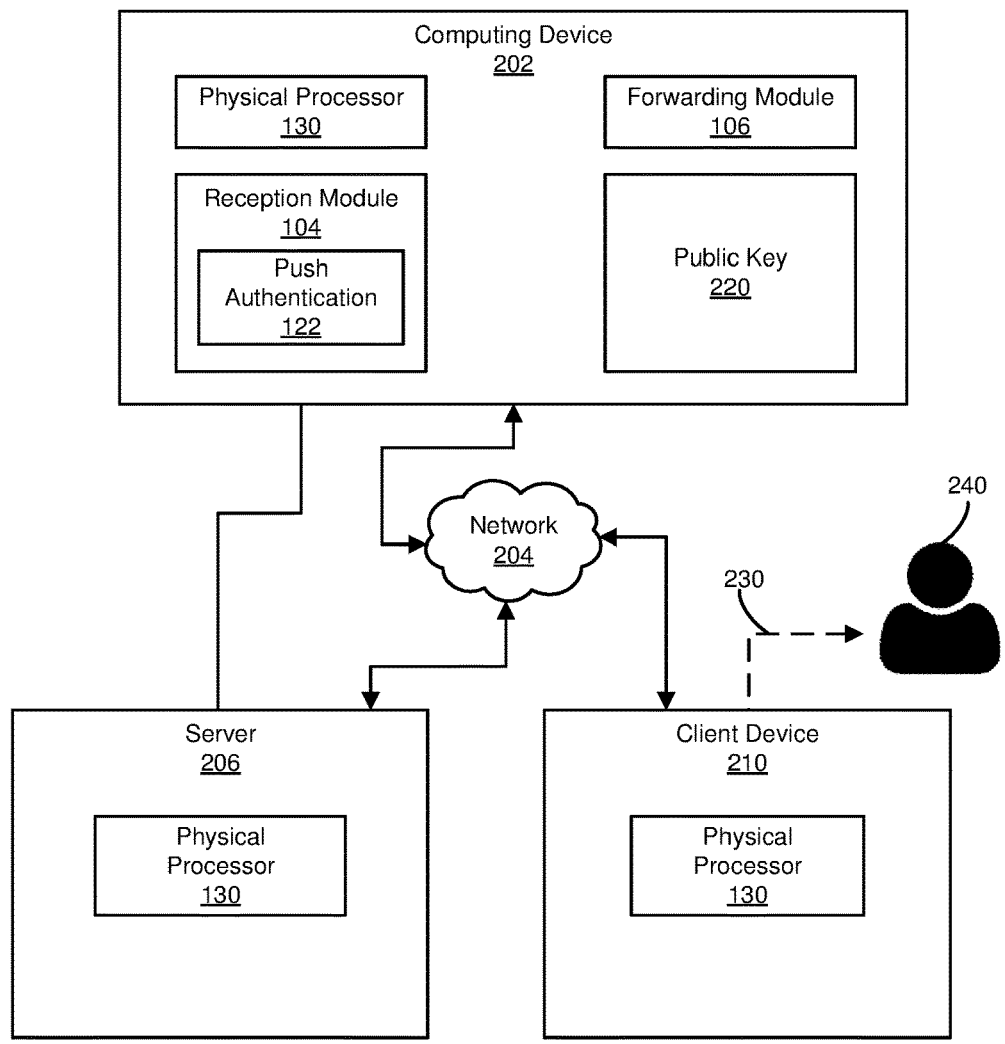
FIG. 2 is a block diagram of an additional example system for securing push authentications.

The following will provide, with reference to FIGS. 1-2, detailed descriptions of example systems for securing push authentications. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

FIG. 1 is a block diagram of example system 100 for securing push authentications. As illustrated in this figure, example system 100 may include one or more modules 102 for performing one or more tasks. For example, and as will be explained in greater detail below, example system 100 may include a reception module 104 that receives, for a security service and from a security service relying party, a push authentication 122 for a user that the security service relying party encrypted using a public key assigned to a client device of the user. The push authentication may include a core message 126 that is encrypted by the security service relying party based on a correct answer to a challenge-response question. Example system 100 may additionally include a forwarding module 106 that forwards, for the security service, push authentication 122 to the client device of the user.

Reception module 104 may further receive, for the security service, a response to push authentication 122 from the client device of the user. Forwarding module 106 may further forward, for the security service, the response to push authentication 122 from the client device of the user to the security service relying party. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate securing push authentications. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

As will be described in greater detail below, one or more of modules 102 from FIG. 1 may, when executed by at least one processor of computing device 202 and/or server 206, enable computing device 202 and/or server 206 to secure push authentications. For example, and as will be described in greater detail below, reception module 104 may receive, for a security service that computing device 202 and from a security service relying party at server 206, push authentication 122 for a user 240 that the security service relying party encrypted using a public key 220 assigned to a client device 210 of user 240. Computing device 202 may correspond to a computing device or backend server operated, or managed, by the security service. Similarly, server 206 may correspond to a backend server operated, or managed, by the security service relying party. Push authentication 122 may include a core message 126, as further discussed above. Core message 126 may be encrypted by the security service relying party based on a correct answer to a challenge-response question.

Subsequently, forwarding module 106 may forward, for the security service, push authentication 122 to client device 210 of the user. At client device 210, a prompt 230 may be displayed to user 240 requesting that user 240 successfully answer the challenge-response question in order to access core message 126. Reception module 104 may receive, for the security service at computing device 202, a response to push authentication 122 from client device 210 of user 240 after user 240 successfully decrypted core message 126 using the correct answer to the challenge-response question. Forwarding module 106 may forward, for the security service at computing device 202, the response to push authentication 122 from client device 210 of user 240 to the security service relying party at server 206.

Computing device 202 generally represents any type or form of computing device capable of reading computer-executable instructions. In some examples, computing device 202 may correspond to a backend security server of the security service, as discussed above. Additionally, server 206 generally represents any type or form of computing device that is capable of transmitting push authentications in accordance with method 300 of FIG. 3. In some examples, server 206 may include a backend server of the security service relying party. Additional examples of computing device 202 and/or server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Client device 210 generally represents a user's endpoint computing device. In some example embodiments, client device 210 may include a mobile device, which may be used for second factor authentication procedures, as discussed further below. Additional examples of 210 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
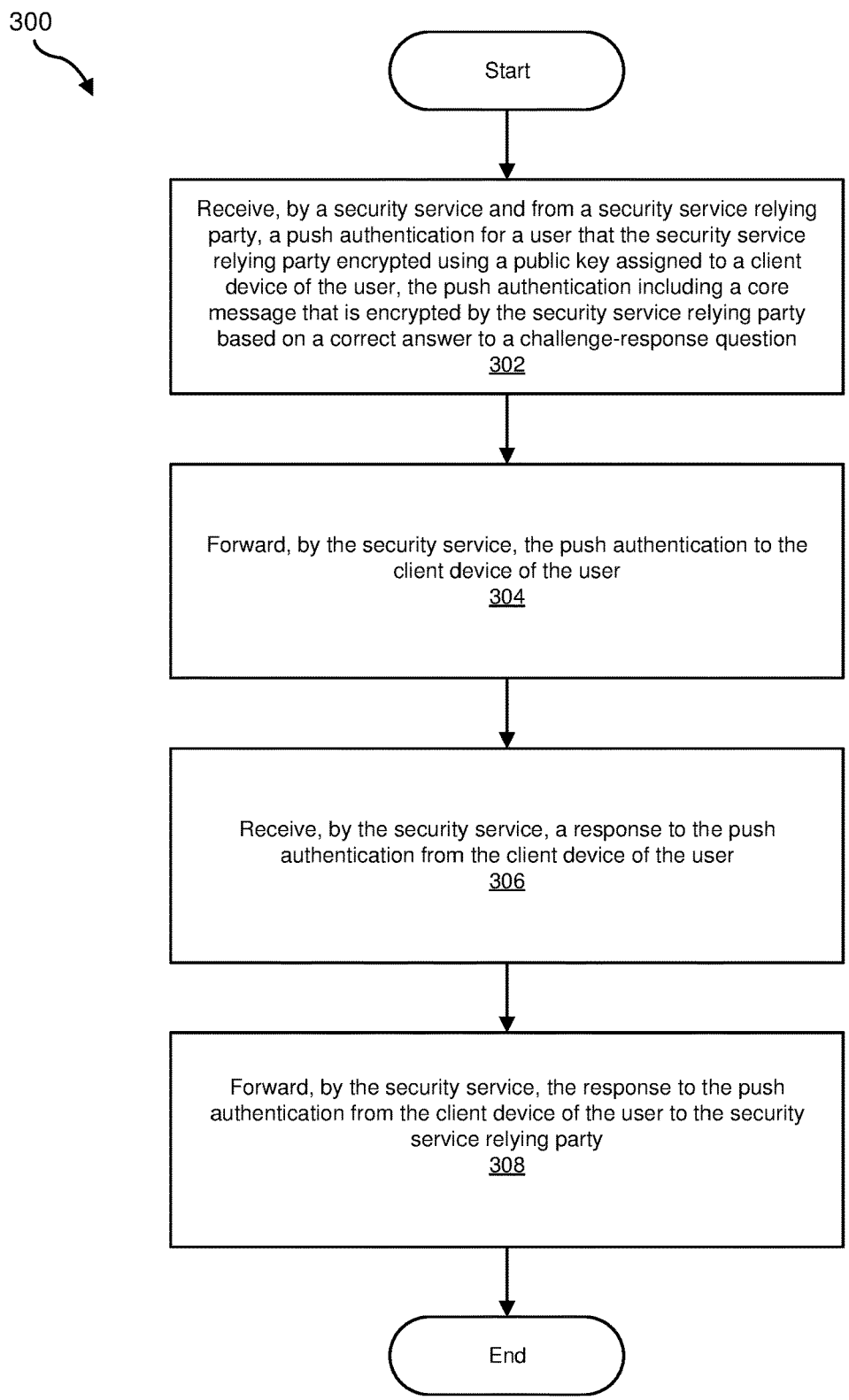
FIG. 3 is a flow diagram of an example method for securing push authentications.

FIG. 3 is a flow diagram of an example computer-implemented method 300 for securing push authentications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, by a security service and from a security service relying party, a push authentication for a user that the security service relying party encrypted using a public key assigned to a client device of the user. The push authentication may include a core message that is encrypted by the security service relying party based on a correct answer to a challenge-response question. For example, reception module 104 may, as part of computing device 202 in FIG. 2, receive, for a security service at computing device 202 and from a security service relying party at server 206, push authentication 122 for user 240 that the security service relying party encrypted using public key 220 assigned to client device 210 of user 240.

As used herein, the term "security service" generally refers to a system, program, and/or infrastructure that provides security for a relying party (e.g., the security service relying party at server 206 of FIG. 2) and/or an end user (e.g., user 240 at client device 210 in FIG. 2). As one example, the security service may correspond to SYMANTEC VALIDATION AND ID PROTECTION. The security service may function as a third-party intermediary that provides strong authentication for end users interacting with a relying party. For example, a business such as ETRADE may potentially rely on the security service to provide strong authentication for users when logging into a website, or other resource, belonging to the business. Accordingly, the term "security service relying party" generally refers to the business, customer, or other account that relies on the security service to provide authentication functionality as an intermediary.

Furthermore, as used herein, the term "push authentication" generally refers to a notification that one party originates and directs to another party, as part of an authentication procedure to authenticate the other party, in accordance with method 300. In some examples, such as the example discussed further below in connection with FIG. 4, the push authentication may refer to a process where a transaction identifier is first transmitted to the intended recipient, as a push notification, without the intended recipient first requesting the transaction identifier or push notification. In response to receiving the transaction identifier, the intended recipient requests the final push authentication. In other examples, the first party transmits the final push authentication directly to the intended recipient without first transmitting the transaction identifier. In either scenario, as used herein, the term "push authentication" generally refers to the message that is finally delivered to the intended recipient.

Additionally, as used herein, the term "core message" generally refers to a message that the security service relying party originally intends to transmit to the end user and then encrypts based on an answer to a challenge-response question according to knowledge based authentication, as discussed below. In some examples, the core message may be encrypted according to nested encryption in which the core message is first encrypted based on the answer to the challenge-response question, and then further encrypted, along with one or more items of data included within the payload of the push authentication, using the public key of the client device.

Furthermore, as used herein, the term "public key" generally refers to the public key portion of a public-private key pair according to asymmetric cryptography. In contrast, the correct answer to the challenge-response question may itself form a symmetric key, or may instead form the passphrase for releasing a symmetric key, which is further used to encrypt the core message, as further discussed above.

Reception module 104 may receive the push authentication in a variety of ways. In some examples, reception module 104 may receive the push authentication in response to providing public key 220 to the security service relying party. In this example, when the security service relying party makes a determination to transmit a push authentication to the user, the security service relying party may first request a copy of the public key of the client device. The security service relying party may obtain the public key of the client device by receiving the public key directly from the security service and/or by receiving an address from which the public key may be copied or downloaded. Alternatively, the security service relying party may previously have obtained, and stored, a copy of the public key of the client device of the user and, therefore, may not need to repeatedly request a copy of the public key. Transmitting the public key of the client device to the security service relying party may enable the security service relying party to encrypt the push authentication using the public key such that only the client device of the user may successfully decrypt the push authentication using a corresponding private key of the public-private key pair.

As first discussed above, reception module 104 may receive the push authentication in accordance with asymmetric cryptography that utilizes both the public and private key of a public-private key pair assigned to the client device of the user. Accordingly, to implement the asymmetric cryptographic system, the client device may first generate the public-private key pair. For example, in one embodiment, reception module 104 may, prior to receiving the push authentication for the user, receive, from the client device, the public key of the client device. Reception module 104 may receive the public key of the client device after the client device generated the public key and a corresponding private key during a key-pair provisioning procedure. In response to receiving the public key, reception module 104 may index the public key of the client device. Indexing the public key of the client device may enable the security service relying party to look up the public key using a security service credential of the user as an indexed key. In some examples, the security service credential of the user may constitute an anonymized token or identifier that keeps a personal or actual identity of the user private from the security service relying party.

At step 304, one or more of the systems described herein may forward, for the security service, the push authentication to the client device of the user. For example, forwarding module 106 may, as part of computing device 202 in FIG. 2, forward, for the security service, push authentication 122 to client device 210 of user 240.

Forwarding module 106 may forward the push authentication in a variety of ways. In some examples, forwarding module 106 may forward the push authentication by directly transmitting the push authentication to the client device of the user. Alternatively, in other examples, forwarding module 106 may forward the push authentication to the client device by first transmitting a transaction identifier that enables the client device to request the push authentication in response to receiving the transaction identifier. In other words, forwarding module 106 may forward the push authentication to the client device of the user by: (i) transmitting a transaction identifier to the client device, (ii) receiving, from the client device, a request for the push authentication, (iii) authenticating the request for the push authentication based on a secret shared between the security service and the client device, and (iv) transmitting the push authentication to the client device in response to authenticating the request for the push authentication. Performing the authentication procedure using the secret shared between the security service and the client device may constitute a form of strong authentication and/or two-factor authentication (e.g., according to SYMANTEC VALIDATION AND ID PROTECTION). In further examples, the transaction identifier is transmitted to the client device through a push notification feature provided by a mobile device operating system of the client device. The mobile device operating system may correspond to a mobile device platform such as APPLE IOS and/or GOOGLE ANDROID, which may each provide push notification functionality, respectively.

Figure 4:
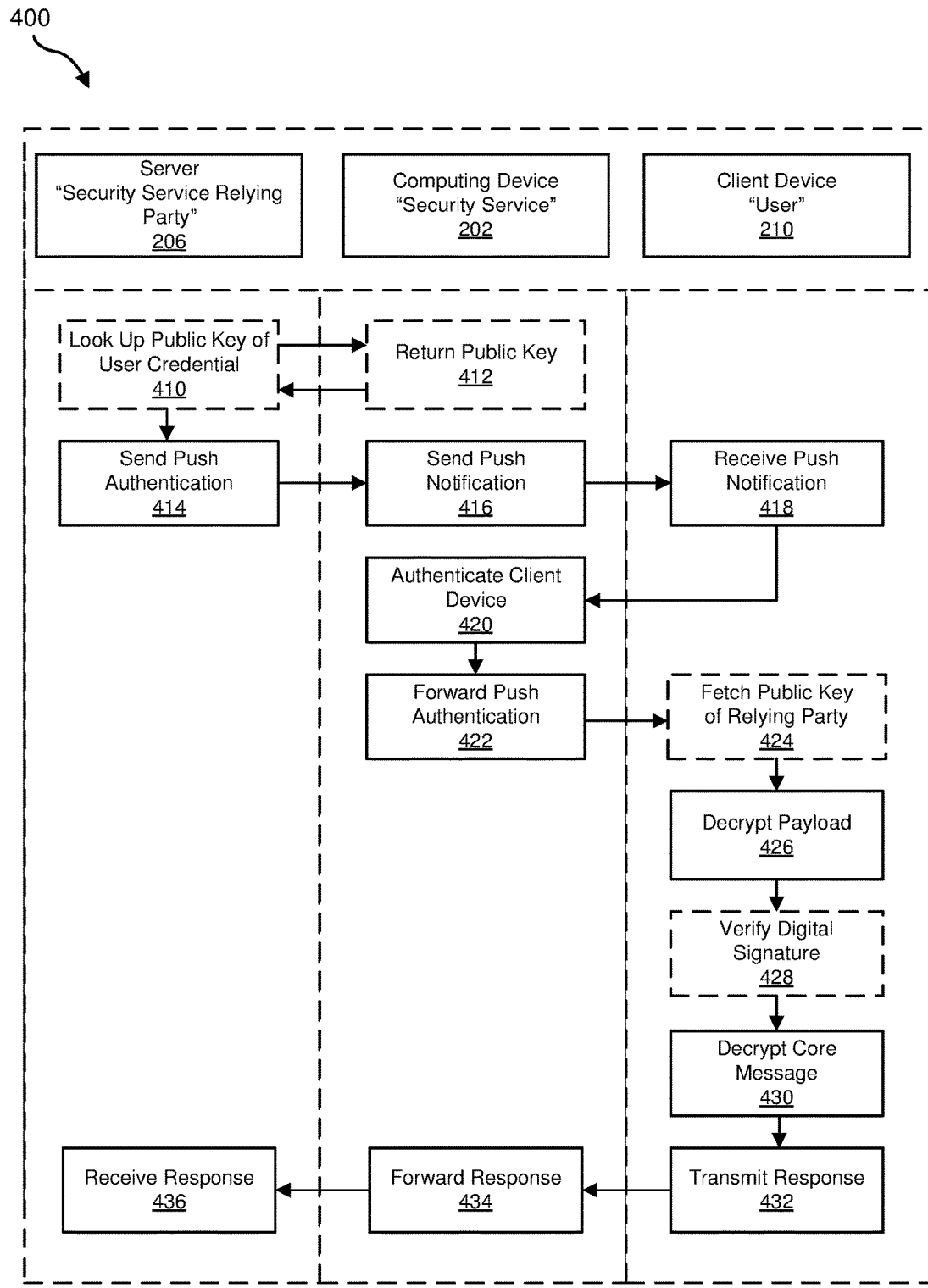
FIG. 4 is a timing diagram of an example workflow that further illustrates the performance of an example method for securing push authentications.

FIG. 4 shows a more detailed timing diagram for a method 400 that corresponds to an illustrative example of the performance of method 300. This timing diagram specifically illustrates the interactions between server 206 (which may correspond to the security service relying party), computing device 202 (which may correspond to the security service), and client device 210 (which may correspond to the user). In contrast, method 300 may focus on the steps performed by computing device 202. As shown in this timing diagram, at step 410, the security service relying party may request the public key for client device 210.

The security service relying party may specify which public key is requested by providing the security service with a security service credential that identifies the user. In general, the security service may index public keys for different client devices according to their respective security service credentials, thereby enabling one or more security service relying parties to look up a copy of a specific public key by referencing the corresponding security service credential.

Additionally, the security service relying party may request the public key in response to determining to transmit push authentication 122 to the client device. For example, the user may be engaging in a user session at server 206 and the user may request to perform a specific transaction. The security service relying party may determine to transmit the push authentication to enable the user at the client device to authorize, and approve, the specific transaction. Moreover, the security service relying party may wish to encrypt the push authentication and, therefore, the security service relying party may request a copy of the public key for the client device. Accordingly, at step 412, reception module 104 may receive the request for the public key transmitted at step 410 and, in response, reception module 104 may return a copy of the public key of the client device to the security service relying party, as further discussed above.

After receiving the copy of the public key at step 412, the security service relying party may generate, encrypt, and transmit push authentication 122 at step 414. The push authentication encrypted by the security service relying party may include different items of content. These different items of content may include core message 126 (e.g., "Do you authorize the specific transaction?") that was previously encrypted based on the correct answer to the challenge response question, as discussed above. The different items of content may also include the challenge-response question itself, thereby enabling the client device of the user, upon receiving the push authentication, to display the challenge-response question, receive the answer, and then use the answer to decrypt the core message. Furthermore, the different items of content may also optionally include a nonce value that the security service relying party dynamically generates to prevent security attacks that are based on repeating previous, or completed, transactions or push authentications (i.e., because the security service relying party dynamically changes the nonce value with each newly attempted transaction or push authentication). Furthermore, the different items of content may also include a copy, or network address, of a public key of the security service relying party, which will enable the client device of the user to encrypt the response to the push authentication.

In addition to these items of data encrypted using the public key of the client device of the user, the push authentication may also include, or be transmitted with, a copy of the security service credential that identifies the user and/or a digital signature of the push authentication that was signed using a private key of the security service relying party, thereby authenticating the security service relying party as the author of the push authentication (i.e., when the client device of the user uses the public key of the security service relying party to decrypt, and thereby verify, the digital signature). In some examples, the digital signature may correspond to a hash of some, or all, of the contents of the push authentication that are encrypted using the private key of the security service relying party.

As further shown in FIG. 4, at step 416, the security service may transmit a push notification to the client device of the user. The push notification may include a transaction identifier that corresponds to the push authentication. The security service may transmit the transaction identifier through the push notification feature of a mobile device operating system. The push notification may be an out-of-band notification, in the sense that it is transmitted through a different channel than a channel through which the user is engaging in the user session with the security service relying party. For example, the user may be engaging in the user session through a client device that is logged into a website, or application, of the security service relying party, whereas the push notification is transmitted to a different client device, which may be mobile or portable. In response, at step 418, the client device of the user may receive the push notification. The client device may also transmit a fetch request to the security service that requests to fetch the push authentication. In one specific example, the client device may establish an outbound HTTPS connection to the security service, authenticate itself, and present the transaction identifier to fetch the push authentication. The client device of the user may authenticate itself, at step 420, based on a secret that is shared by the security service and the client device of the user, thereby demonstrating to the security service that the fetch request is authentic and originates from the actual user. Consequently, at step 422, forwarding module 106 may forward the push authentication to the client device of the user.

Returning to FIG. 4, the client device of the user may receive the push authentication in response to forwarding module 106 forwarding the push authentication at step 422. In response, at step 424, the client device of the user may optionally fetch the public key of the security service relying party to enable the client device of the user to encrypt the response to the push authentication. The client device of the user may optionally fetch the public key of the security service relying party at any point prior to encrypting the response to the push authentication. The client device of the user may fetch the public key of the security service relying party by referencing a copy of the public key and/or a network address (such as a UNIFORM RESOURCE LOCATOR) where the public key of the security service relying party is located. The copy of the public key and/or the network address may optionally be included within the push authentication itself, as discussed further above. In other examples, the client device of the user may already possess a copy of the public key of the security service relying party and, therefore, step 424 may be omitted in this scenario.

After fetching the public key of the security service relying party at step 424, the client device of the user may, at step 426, decrypt a payload of the push authentication. As discussed further above, the payload of the push authentication may include core message 126, which was previously encrypted based on the correct answer to the challenge-response question, the challenge-response question, the nonce value dynamically generated to prevent security attacks based on transaction repetition, and/or a copy or network address of the public key of the security service relying party. Accordingly, at steps 424-426, the client device of the user may display, or output, the challenge-response question in an attempt to obtain the correct answer from the user, which may be used to decrypt the core message at step 430.

Furthermore, at step 428, the client device of the user may optionally verify the digital signature that was included within, or transmitted with, the push authentication at step 414. In some examples, the client device of the user may verify the digital signature by (i) generating a hash of some or all of the contents of the payload decrypted at step 426, (ii) decrypting the digital signature using the public key of the security service relying party (which may be retrieved at step 424, as discussed above), and then (iii) comparing the generated hash with the results of the decrypting the digital signature to verify that these two items of data match.

Figure 5:
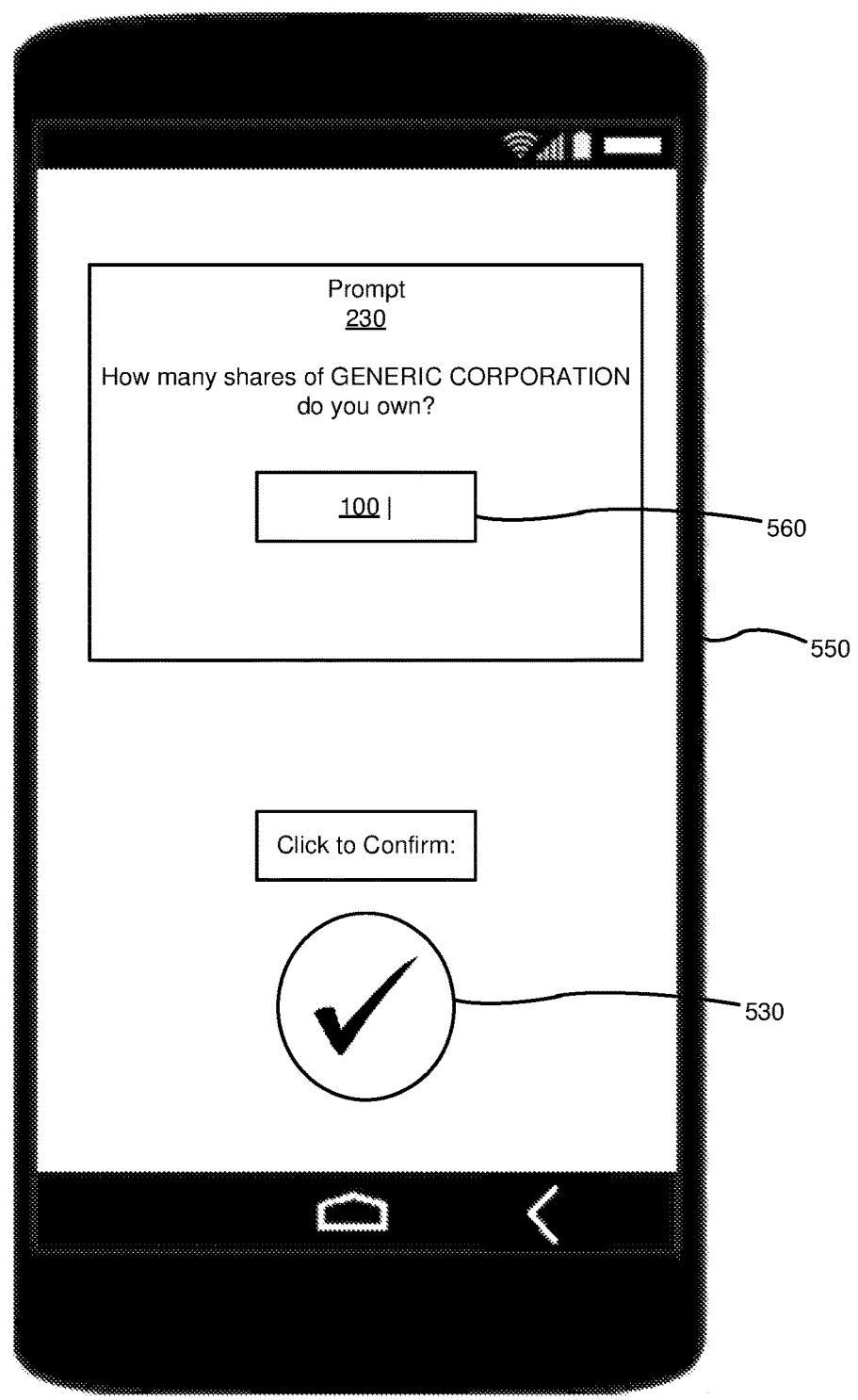
FIG. 5 is a block diagram of an example smartphone display.

FIG. 5 shows a block diagram of a smartphone 550 that is displaying prompt 230, which includes the challenge-response question, "[h]ow many shares of GENERIC CORPORATION do you own?" In this example, the challenge-response question asks the user about a number of shares of the corporation that the user owns. Nevertheless, the challenge-response question may ask the user about any information that is private to the user and, therefore, that provides a level of assurance that the user himself or herself, rather than an imposter or attacker, is answering the challenge-response question and decrypting the core message.

Figure 6:
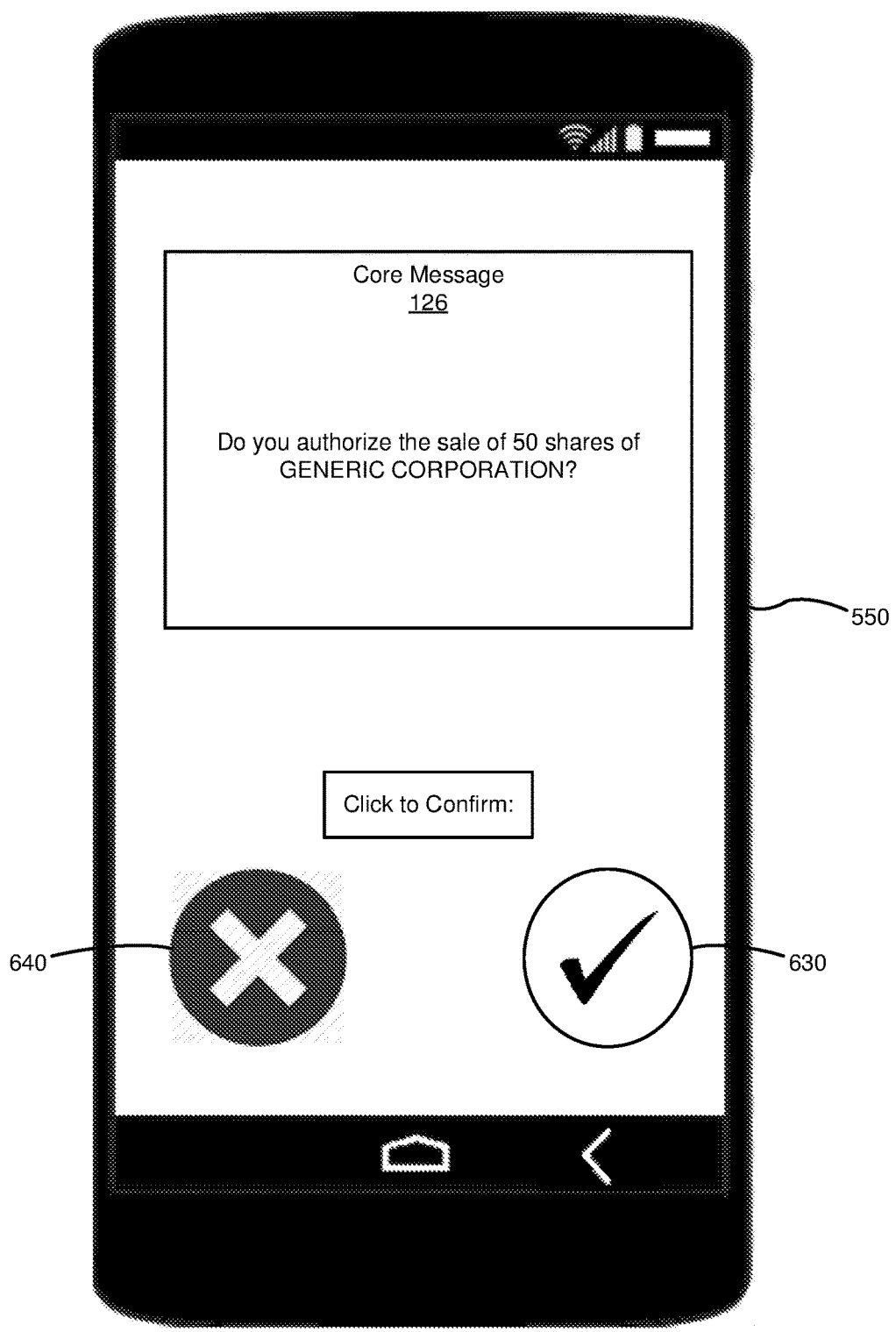
FIG. 6. is a block diagram of another example smartphone display.

In general, the correct answer to the challenge-response question may be kept private from the security service such that the security service is prevented from reading the core message of the push authentication. In the example of FIG. 5, the user may own shares of a corporation, such as GENERIC CORPORATION, using the security service relying party, such as ETRADE, as a broker. Nevertheless, the security service itself, which may correspond to a third-party intermediary such as SYMANTEC providing VALIDATION AND ID PROTECTION and corresponding strong authentication, may not possess any private information about the user accounts that the user maintains with the security service relying party. Accordingly, in the example of FIG. 5, the security service itself may not know the answer to the question "[h]ow many shares of GENERIC CORPORATION do you own?" As further shown in FIG. 5, the user may enter an answer to the challenge-response question within an input field 560. In this specific example, the user has entered the value of "100," which may correspond to a correct answer to the question, thereby enabling the client device to decrypt the core message, which may be subsequently displayed by smartphone 550, as shown in FIG. 6, which is discussed in more detail below.

In one embodiment, the correct answer to the challenge-response question is based on a user session of the user with the security service relying party through dynamic knowledge-based authentication. For example, the user may be currently signed into, or logged into, a user session at a server of the security service relying party (e.g., server 206), such as an online brokerage service. During the user session, the security service relying party may display, or output, one or more items of data to the user. Additionally, the security service relying party may generate the challenge-response question, and/or the answer to the challenge-response question, based upon information displayed or output during this user session, or during the most recent user session. In this manner, the information displayed to the user may be fresh in the user's memory or currently available to the user through the client device. Moreover, in this manner, the information used to generate the challenge-response question, and/or the correct answer to the challenge-response question, may dynamically change from user session to user session, or dynamically change from push authentication to push authentication, in a rolling manner. In general, the correct answer to the challenge-response question may specify any item of data relating to a current, or previous, user session in which the user engaged with the security service relying party (e.g., any item of data output or input during the user session and/or a timing of the user session).

Additionally or alternatively, the correct answer to the challenge-response question may indicate an item of personally identifiable information of the user and/or an account number of the user with the security service relying party. For example, the correct answer may correspond to a date of birth, a financial, medical, legal, driver, and/or educational account number, and/or a Social Security number. In some examples, the payload of the push authentication may be encrypted using a symmetric key that is formed, or derived, based on multiple ones of the example items of data listed above (e.g., a combination of an item of data from a user session according to dynamic knowledge-based authentication, a Social Security number, and/or a date of birth). Returning to FIG. 5, upon entering the answer to the challenge-response question using the input field 560, the user may subsequently click a checkmark 530 to submit the answer.

In response to receiving the correct answer to the challenge response question, the client device of the user may successfully decrypt the core message using the correct answer as a cryptographic key. For example, the correct answer may itself constitute a symmetric key that decrypts the core message. Additionally or alternatively, the correct answer may constitute a passphrase that, when submitted by the user at the client device, releases a symmetric key for decrypting the core message. In general, the core message may be encrypted based on the correct answer to the challenge-response question.

In the above examples, the client device issues the challenge-response question to solicit the correct answer that the client device may use to decrypt the core message. In other examples, the challenge-response question may be omitted, and the core message may only be encrypted using the public key of the client device.

Upon successfully decrypting the core message, the client device of the user may further display the core message, as illustrated in the example of FIG. 6. As further shown in this figure, core message 126 may include the string of text, "[d]o you authorize the sale of 50 shares of GENERIC CORPORATION?" Accordingly, this figure shows an example in which the push authentication prompts the user to approve a transaction at the security service relying party. The transaction may constitute a financial transaction, as in the example of FIG. 6, and/or another transaction, such as a transfer of, or release of, records (e.g., financial, medical, driver or vehicle, educational records, etc.). The transaction may also include a purchase of goods and/or services. In the example of FIG. 6, the user may select a checkmark 630 or, instead, a cancellation mark 640 to either approve of the proposed transaction or reject the proposed transaction, respectively.

Moreover, in response to approving the proposed transaction, the client device of the user may generate and transmit a response to the push authentication at step 432. For example, the client device of the user may generate an approval message, and then encrypt the approval message using the public key of the security service relying party. The client device of the user may have previously fetched the public key of the security service relying party at step 424, as discussed further above. In general, the response to the push authentication may approve the transaction at the security service relying party. In these examples, the security service relying party, upon receiving the response to the push authentication, may complete the transaction.

At step 306, one or more of the systems described herein may receive, for the security service, a response to the push authentication from the client device of the user. For example, reception module 104 may, as part of computing device 202 in FIG. 2, receive, for the security service, a response to push authentication 122 from client device 210 of the user.

Reception module 104 may receive the response to the push authentication in a variety of ways. In general, reception module 104 may receive the response to the push authentication after the client device of the user successfully decrypts the push authentication using the private key of the client device of the user, and also after the client device of the user successfully decrypts core message 126 using the correct answer to the challenge-response question. In other words, reception module 104 may generally receive the response to the push authentication at step 434 of the timing diagram shown in FIG. 4.

In general, the response to the push authentication may indicate that the user successfully decrypted the core message, and yet the security service itself may be unable to detect this indication. For example, the response to the push authentication may be configured, or encrypted, based on the correct answer to the challenge-response question. Nevertheless, the security service itself may be unaware of the correct answer to the challenge-response question. Accordingly, the security service may be unable to decrypt the response to the push authentication. In other examples, the response to the push authentication may be simply encrypted using the public key of the security service relying party, which may be sufficient to prevent the security service from accessing the contents of the response to the push authentication (i.e., in the case that the security service itself does not possess a copy of the private key for the security service relying party). In these examples, the response to the push authentication may contain the correct answer to the challenge response question, which may further authenticate the user and validate the response to the push authentication (i.e., by demonstrating to the security service relying party that the client device of the user successfully answered the challenge-response question).

At step 308, one or more of the systems described herein may forward, for the security service, the response to the push authentication from the client device of the user to the security service relying party. For example, forwarding module 106 may, as part of computing device 202 in FIG. 2, forward, for the security service, the response to push authentication 122 from client device 210 of user 240 to the security service relying party at server 206.

Forwarding module 106 may forward the response to the push authentication in a variety of ways. In general, forwarding module 106 may either transmit the response to the push authentication directly to the security service relying party and/or may publish the response to the push authentication to a network address where the security service relying party may access and/or download it. In the example of FIG. 4, forwarding module 106 may forward the response to the push authentication at step 434. Accordingly, at step 436, the security service relying party may receive the response to the push authentication.

In view of the above, the disclosed systems and methods may successfully provide end-to-end encryption of a sensitive payload of a push authentication. The disclosed systems and methods may thereby prevent a security service intermediary, such as SYMANTIC VALIDATION AND ID PROTECTION, from accessing the contents of the sensitive payload. Moreover, the disclosed systems and methods may guarantee perfect forward secrecy when the security service relying party implements methods for rolling knowledge-based authentication seeds based on user activity within a user session. Furthermore, the disclosed systems and methods may build upon traditional PUBLIC KEY INFRASTRUCTURE and/or PRETTY GOOD PRIVACY constructs, yet leverage a strong authentication procedure and/or a two-factor authentication procedure, such as SYMANTEC VALIDATION AND ID PROTECTION, to securely exchange public exponents between the security service relying party and the client device of the user, as further discussed above.

Figure 7:
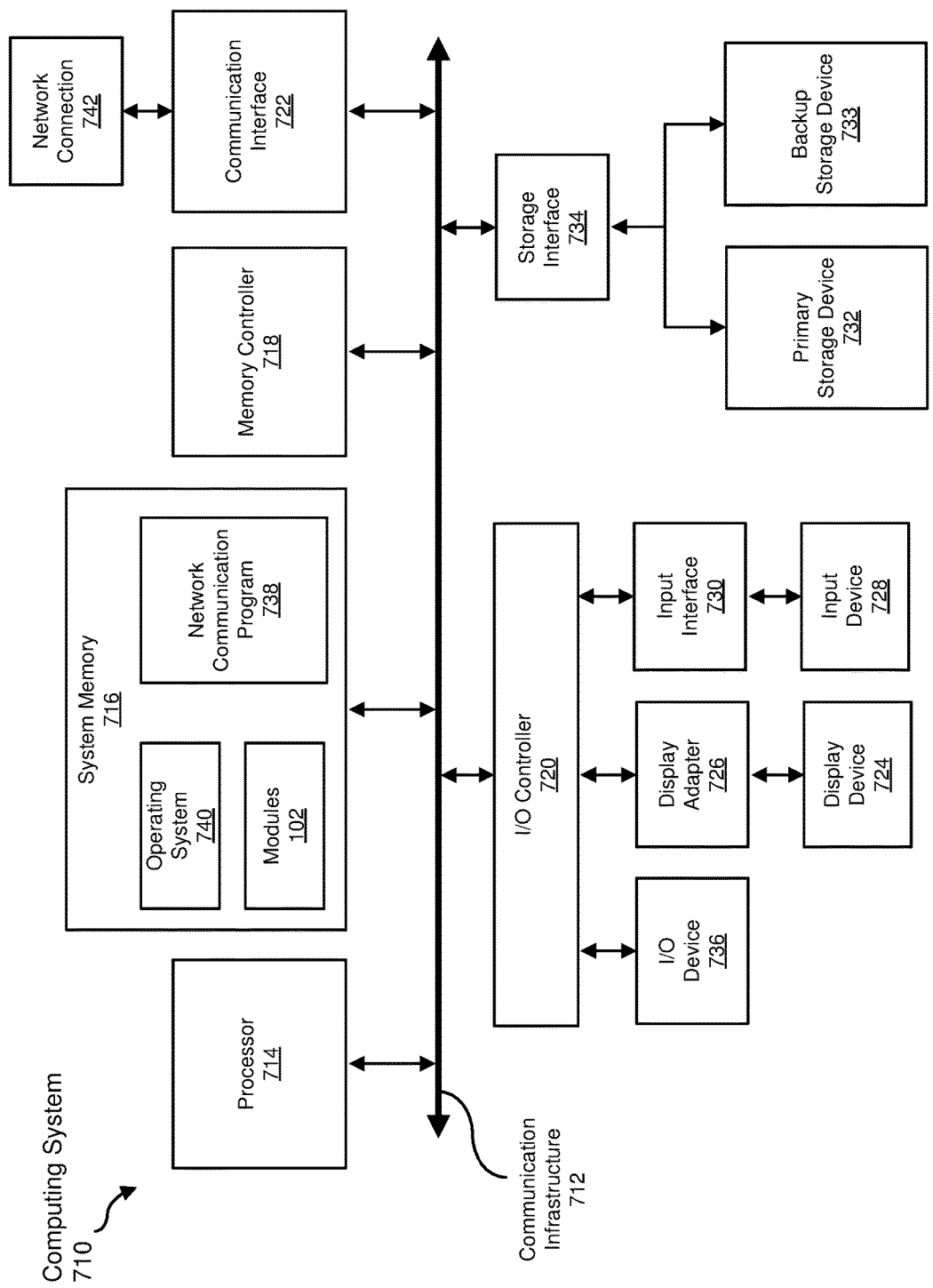
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
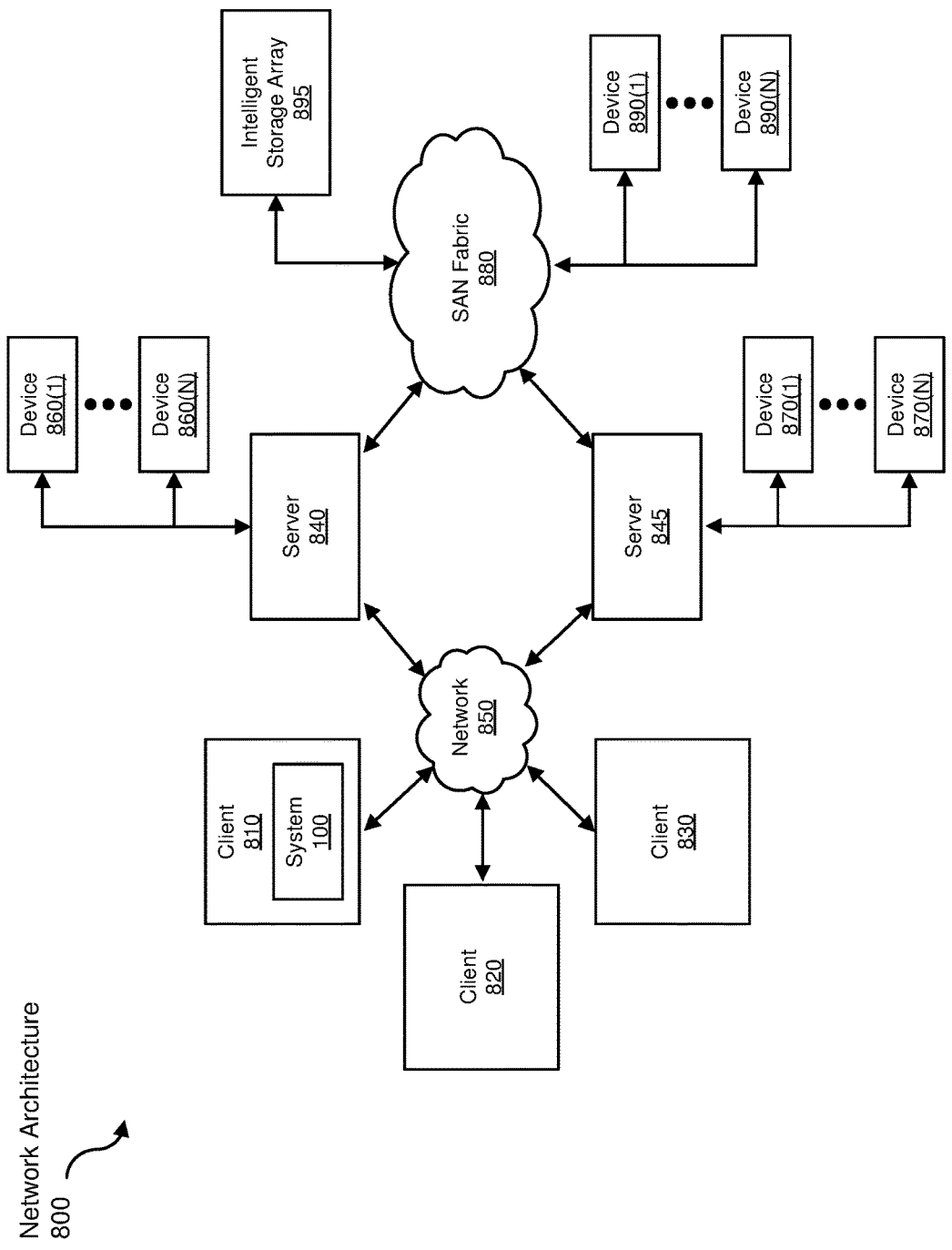
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for securing push authentications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may encrypt a push authentication using a public key of the client device and/or encrypt a core message of the push authentication based on a correct answer to a challenge-response question. Additionally, one or more of the modules recited herein may thereby protect a user and/or protect a security service relying party by securing the content of the push authentication such that a corresponding security service, as an intermediary, cannot access the content, as further discussed above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securing push authentications, at least a portion of the method being performed by a computing device comprising at least one processor, the method comprising:
    receiving, by a security service and from a security service relying party, a push authentication for a user that the security service relying party encrypted using a public key assigned to a client device of the user, the push authentication including a core message that is encrypted by the security service relying party based on a correct answer to a challenge-response question;
    forwarding, by the security service, the push authentication to the client device of the user;
    receiving, by the security service, a response to the push authentication from the client device of the user; and
    forwarding, by the security service, the response to the push authentication from the client device of the user to the security service relying party.

2. The computer-implemented method of claim 1, further comprising, prior to receiving the push authentication for the user:
    receiving, from the client device, the public key of the client device after the client device generated the public key and a corresponding private key during a key-pair provisioning procedure; and
    indexing the public key of the client device such that the security service relying party can look up the public key using a security service credential of the user as an indexed key.

3. The computer-implemented method of claim 1, wherein the security service receives the push authentication in response to providing the public key to the security service relying party.

4. The computer-implemented method of claim 1, wherein forwarding the push authentication to the client device of the user comprises:
    transmitting a transaction identifier to the client device;
    receiving, from the client device, a request for the push authentication;
    authenticating the request for the push authentication based on a secret shared between the security service and the client device; and
    transmitting the push authentication to the client device in response to authenticating the request for the push authentication.

5. The computer-implemented method of claim 4, wherein the transaction identifier is transmitted to the client device through a push notification feature provided by a mobile device operating system of the client device.

6. The computer-implemented method of claim 1, wherein the correct answer to the challenge-response question is kept private from the security service such that the security service is prevented from reading the core message of the push authentication.

7. The computer-implemented method of claim 6, wherein the correct answer to the challenge-response question is based on a user session of the user with the security service relying party through dynamic knowledge-based authentication.

8. The computer-implemented method of claim 1, wherein the correct answer to the challenge-response question indicates at least one of:
    an item of personally identifiable information of the user; and
    an account number of the user with the security service relying party.

9. The computer-implemented method of claim 1, wherein the core message of the push authentication prompts the user to approve a transaction at the security service relying party.

10. The computer-implemented method of claim 9, wherein:
    the response to the push authentication approves the transaction at the security service relying party; and
    the security service relying party completes the transaction in response to receiving the response to the push authentication from the client device of the user.

11. A system for securing push authentications, the system comprising:
    a reception module, stored in memory, that receives, for a security service and from a security service relying party, a push authentication for a user that the security service relying party encrypted using a public key assigned to a client device of the user, the push authentication including a core message that is encrypted by the security service relying party based on a correct answer to a challenge-response question;
    a forwarding module, stored in memory, that forwards, for the security service, the push authentication to the client device of the user;
    wherein:
        the reception module receives, for the security service, a response to the push authentication from the client device of the user;
        the forwarding module forwards, for the security service, the response to the push authentication from the client device of the user to the security service relying party; and
    at least one physical processor configured to execute the reception module and the forwarding module.

12. The system of claim 11, wherein, prior to receiving the push authentication for the user, the reception module further:
    receives, from the client device, the public key of the client device after the client device generated the public key and a corresponding private key during a key-pair provisioning procedure; and
    indexes the public key of the client device such that the security service relying party can look up the public key using a security service credential of the user as an indexed key.

13. The system of claim 11, wherein the reception module receives the push authentication in response to providing the public key to the security service relying party.

14. The system of claim 11, wherein the forwarding module forwards the push authentication to the client device of the user at least in part by:
  transmitting a transaction identifier to the client device;
  receiving, from the client device, a request for the push authentication;
  authenticating the request for the push authentication based on a secret shared between the security service and the client device; and
  transmitting the push authentication to the client device in response to authenticating the request for the push authentication.

15. The system of claim 14, wherein the transaction identifier is transmitted to the client device through a push notification feature provided by a mobile device operating system of the client device.

16. The system of claim 11, wherein the correct answer to the challenge-response question is kept private from the security service such that the security service is prevented from reading the core message of the push authentication.

17. The system of claim 16, wherein the correct answer to the challenge-response question is based on a user session of the user with the security service relying party through dynamic knowledge-based authentication.

18. The system of claim 11, wherein the correct answer to the challenge-response question indicates at least one of:
  an item of personally identifiable information of the user; and
  an account number of the user with the security service relying party.

19. The system of claim 11, wherein the core message of the push authentication prompts the user to approve a transaction at the security service relying party.

20. A non-transitory computer-readable medium comprising one or more computer-readable instructions that, when executed by at least one processor of a computing device, cause the computing device to:
  receive, by a security service and from a security service relying party, a push authentication for a user that the security service relying party encrypted using a public key assigned to a client device of the user, the push authentication including a core message that is encrypted by the security service relying party based on a correct answer to a challenge-response question;
  forward, by the security service, the push authentication to the client device of the user;
  receive, by the security service, a response to the push authentication from the client device of the user; and
  forward, by the security service, the response to the push authentication from the client device of the user to the security service relying party.

* * * * *